US00RE50407E

(19) United States
(12) Reissued Patent
Turnbull

(10) Patent Number: US RE50,407 E
(45) Date of Reissued Patent: Apr. 29, 2025

(54) INTRASCOPIC HYDRAULIC CYLINDER

(71) Applicant: FLIP SCREEN AUSTRALIA PTY LTD, East Wagga Wagga (AU)

(72) Inventor: Sam Turnbull, Mangoplah (AU)

(73) Assignee: FLIP SCREEN AUSTRALIA PTY LTD, East Wagga Wagga (AU)

(21) Appl. No.: 17/867,498

(22) Filed: Jul. 18, 2022

Related U.S. Patent Documents

Reissue of:
(64) Patent No.: 11,333,176
Issued: May 17, 2022
Appl. No.: 17/059,080
PCT Filed: May 28, 2019
PCT No.: PCT/AU2019/050527
§ 371 (c)(1),
(2) Date: Nov. 25, 2020
PCT Pub. No.: WO2019/227146
PCT Pub. Date: Dec. 5, 2019

(30) Foreign Application Priority Data

May 29, 2018 (AU) ..... 2018203763

(51) Int. Cl.
*F15B 15/14* (2006.01)
*F15B 15/16* (2006.01)

(52) U.S. Cl.
CPC ..... *F15B 15/1409* (2013.01); *F15B 15/16* (2013.01); *F15B 15/1428* (2013.01); *F15B 2211/775* (2013.01)

(58) Field of Classification Search
CPC ... F15B 15/1409; F15B 15/16; F15B 15/1428
See application file for complete search history.

(56) References Cited

U.S. PATENT DOCUMENTS 2,577,462 A 12/1951 Hackney
3,371,582 A 3/1968 Schmidt
(Continued)

FOREIGN PATENT DOCUMENTS

DE 102013212560 A1 12/2014
WO 2015190972 12/2015
WO 2018065670 4/2018

OTHER PUBLICATIONS

The extended European Search Report for EP application No. 19812128.7, dated Apr. 21, 2022, 6 pages.
(Continued)

*Primary Examiner* — William E Dondero
(74) *Attorney, Agent, or Firm* — Mannava & Kang, P.C.

(57) ABSTRACT

A hydraulic cylinder (1) which acts as a cylinder hollow rod in an outer hydraulic cylinder (10) is disclosed comprising an inner rod (4) with a piston (2) and piston-gland (3) wherein the cylinder hollow rod (1) is held longitudinally displaceably in the cylinder housing (10). The system additionally has a cylinder base (5) and a fibre cover (14) on the outer casing of hydraulic cylinder (10). The system also has ports for fluid (11, 12 and 13) corresponding to four chambers, (67, 8 and 9 respectively). According to the invention, when pressure is applied to chamber (7), the internal rod (4) extends into the chamber (6), displacing its mass and dramatically increases the pressure in Chamber (6). This displacement is effectively an internal pump which can be activated multiple times within a given stroke of rod (1).

20 Claims, 4 Drawing Sheets

Amended

(56) References Cited

U.S. PATENT DOCUMENTS

| | | | | |
|---|---|---|---|---|
| 3,722,375 | A * | 3/1973 | Sievenpiper | F16C 33/20 92/168 |
| 5,007,327 | A | 4/1991 | Kamimura et al. | |
| 5,341,725 | A * | 8/1994 | Dick | F01B 7/00 91/216 A |
| 6,688,211 | B1 * | 2/2004 | Viet | B25B 5/061 92/151 |
| 7,823,803 | B2 * | 11/2010 | Peterson | F15B 15/1409 239/166 |
| 2010/0077918 | A1 | 4/2010 | Hoelzl et al. | |
| 2012/0126055 | A1 * | 5/2012 | Lindahl | B64C 25/60 244/104 FP |
| 2017/0261015 | A1 * | 9/2017 | Tsutsui | B63H 20/10 |

OTHER PUBLICATIONS

International Search Report and Written Opinion dated Jun. 27, 2019, PCT Patent Application No. PCT/AU2019/050527, filed May 28, 2019, Australian Patent Office, 8 pages.

* cited by examiner

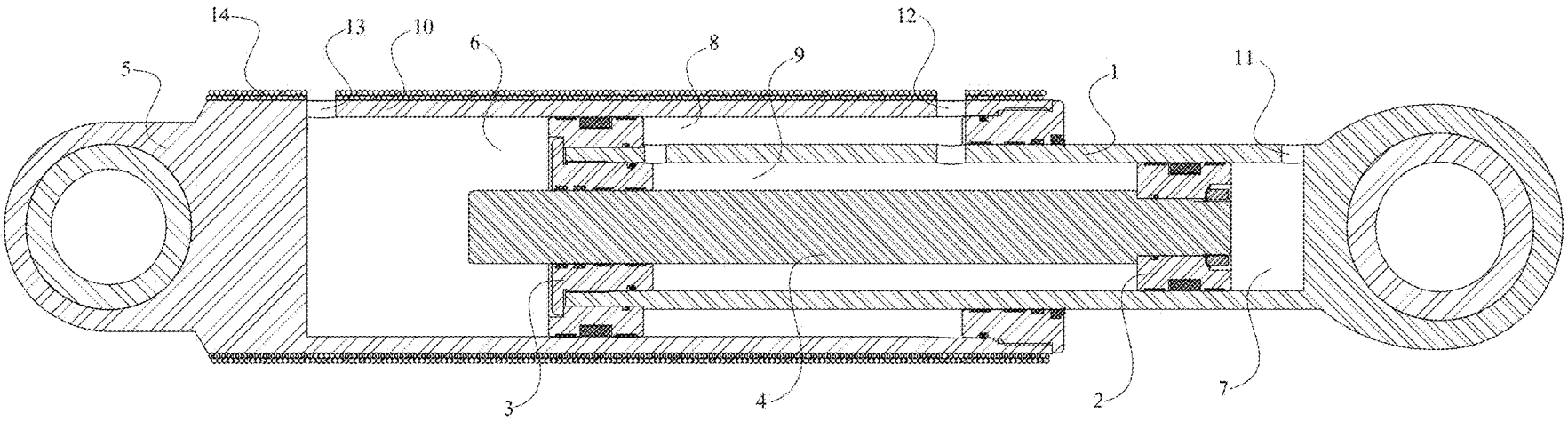
Figure 1
Amended

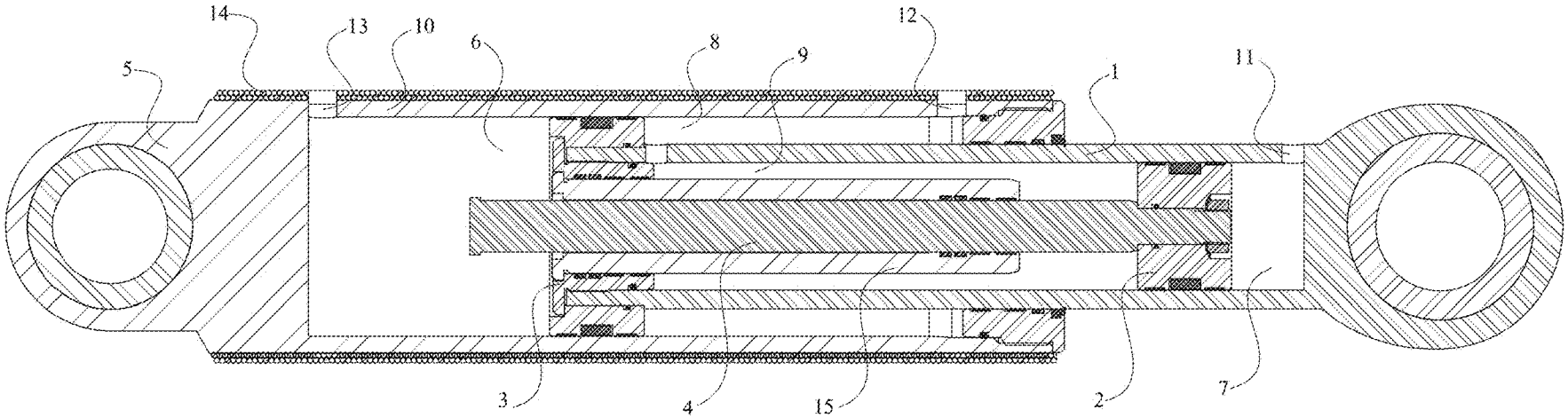
Figure 2
Amended

Test Results of Prototype Intrascopic Hydraulic Cylinder

| Time (Sec) | Pressure (Bar) | | |
|---|---|---|---|
| | Supply to Chamber 6 | In Chamber 6 | In Chamber 7 "Rod Cylinder" |
| 32 | 0 | 0 | 0 |
| 33 | 0 | 0 | 0 |
| 34 | 0 | 0 | 0 |
| 35 | 0 | 0 | 0 |
| 36 | 0 | 0 | 0 |
| 37 | 0 | 0 | 0 |
| 38 | 0 | 0 | 0 |
| 38.221 | 15 | 7 | 0 |
| 38.321 | 19 | 21 | 0 |
| 38.421 | 24 | 26 | 0 |
| 38.521 | 26 | 30 | 0 |
| 38.621 | 29 | 33 | 0 |
| 38.721 | 32 | 35 | 0 |
| 38.821 | 34 | 36.5 | 0 |
| 38.921 | 36 | 39 | 0 |
| 39.021 | 38 | 40 | 0 |
| 39.121 | 40 | 41 | 0 |
| 39.221 | 41 | 42 | 0 |
| 39.321 | 43 | 43 | 0 |
| 39.421 | 44 | 43 | 2 |
| 39.521 | 45 | 44 | 5 |
| 39.621 | 45 | 44 | 7.5 |
| 39.721 | 45 | 45 | 10 |
| 39.821 | 46 | 45 | 15 |
| 39.921 | 47 | 46 | 16 |
| 40.021 | 47 | 46 | 17.5 |
| 40.121 | 47 | 46 | 19 |
| 40.221 | 45 | 48 | 20 |
| 40.321 | 45 | 50 | 22 |
| 40.421 | 45 | 54 | 24 |
| 40.521 | 44 | 55 | 25 |
| 40.623 | 43 | 65 | 25 |
| 40.723 | 43 | 72 | 27 |
| 40.823 | 43 | 76 | 29 |

| Time (Sec) | Pressure (Bar) | | |
|---|---|---|---|
| | Supply to Chamber 6 | In Chamber 6 | In Chamber 7 "Rod Cylinder" |
| 40.923 | 43 | 90 | 30 |
| 41.023 | 43 | 95 | 31 |
| 41.123 | 43 | 98 | 32.5 |
| 41.223 | 43 | 100 | 34 |
| 41.323 | 44 | 105 | 35 |
| 41.423 | 44 | 109 | 36 |
| 41.523 | 44 | 116 | 37 |
| 41.623 | 45 | 117 | 38 |
| 41.723 | 45 | 120 | 40 |
| 41.823 | 45 | 124 | 41 |
| 41.923 | 46 | 125 | 42 |
| 42.023 | 46 | 127 | 42 |
| 42.123 | 47 | 130 | 44 |
| 42.223 | 48 | 132 | 44 |
| 42.323 | 48 | 134 | 45 |
| 42.423 | 49 | 135 | 45 |
| 42.523 | 49.5 | 136 | 46 |
| 42.623 | 50 | 136 | 46 |
| 42.723 | 50 | 137 | 47 |
| 42.823 | 50 | 137 | 48 |
| 42.923 | 50 | 137 | 48 |
| 43.023 | 50 | 138 | 49 |
| 43.123 | 50 | 138 | 50 |
| 43.223 | 50 | 138 | 50 |
| 43.323 | 50 | 138 | 50 |
| 43.423 | 50 | 138 | 50 |
| 43.523 | 50 | 138 | 50 |
| 43.623 | 50 | 138 | 50 |
| 43.723 | 50 | 138 | 50 |
| 43.823 | 50 | 138 | 50 |
| 43.923 | 50 | 138 | 50 |
| 44.023 | 50 | 138 | 50 |
| 44.123 | 50 | 138 | 50 |
| 44.223 | 50 | 138 | 50 |

Figure 3

160
140
120
100
80
60
40
20
0
Pressure (Bar)
32
44.223
Timestamp (in seconds)
Pressure in Supply to Chamber 6
Pressure in Chamber 6
Pressure in Chamber 7 "Rod Cylinder"

INTRASCOPIC HYDRAULIC CYLINDER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CLAIM FOR PRIORITY

The present application is a national stage filing under 35 U.S.C 371 of PCT application number PCT/AU2019/050527, having an international filing date of May 28, 2019, which claims priority to Australian patent application number 2018203763 having a filing date of May 29, 2018, the disclosures of which are hereby incorporated by reference in their entireties.

TECHNICAL FIELD

This invention relates to a hydraulic cylinder and more particular to a hydraulic cylinder having an intrascopic arrangement of a co-axial cylindrical hollow rod within it acting as a piston-rod thereby enabling it to produce a multitude of variations in forces, speeds, pressures and flows for its application in areas beyond the scope of conventional hydraulic cylinders.

BACKGROUND ART

Hydraulic cylinders are used extensively in a variety of industrial applications to provide linear motion control. These cylinders are composed of a cylindrically shaped metal case with a piston-rod assembly that moves back and forth within the case. The piston and rod assembly divides the volume inside the cylinder case to two separate chambers, for example front chamber and rear chamber. For a single rod cylinder, these two volumes are called: the rod end volume (front chamber), where the rod end is the end of the cylinder from which the rod protrudes, and the cap end volume (rear chamber), where the cap end does not have a rod.

As these volumes are pressurized, hydrostatic forces due to the pressurized fluid act on the surfaces of the vessel containing the fluid. Thus, the forces acting on the piston-rod assembly cause it to move, extending the rod out of the cylinder case or retracting the rod into the cylinder case. An external load can be attached to cylinder rod, and as the piston-rod assembly moves, a force is exerted on the load causing the load to move along a linear path. For a cylinder in retraction, the flow leaving the cap end exits through a port before returning to the rest of the hydraulic circuit through a cylinder port. The cylinder stops when the piston reaches the end of its stroke, or when the piston makes contact with the end cap. Usually, a cylinder cushion spear and a collar are attached on the either side of the piston to help it decelerate before it contacts the end cap during retraction or reaches the other end during extension, respectively.

Thus, the conventional double acting hydraulic cylinders which have a rear chamber and a front chamber essentially function by extending and retracting the piston-rod assembly within the internal surface of cylinder case. In a normal case, the speed with which piston-rod assembly extends is larger than when it retracts. This means that it moves in either direction at different speeds. The reason for this difference can be understood by considering the fact that when the pump pushes certain amount of fluid, it goes through the valve either to the rear end or to the front end. As it is, there is much more fluid required in the rear chamber to push the piston to extend than there is fluid required in the front chamber to push it for retraction. Thus, when a dominant pressure is introduced to the rear of the cylinder the rod extends slowly and when a similar pressure is applied to the front of the cylinder then it would retract much more quickly.

When there is need for speed control of piston-rod assembly during extension or during the retraction, the same can be achieved by controlling the fluid flow. A general approach is to install a flow control device in the hydraulic circuit between valve and fluid inlet/outlet of the rear or front chambers.

There have been many attempts as reported in the prior art literature to create a multi-power cylinder but they all included external solutions. The invention disclosed herein is a solution fully integrated into a standalone hydraulic cylinder and control. There is no need for an external intensifier, secondary hydraulic lines with high pressure, or any other compromises.

SUMMARY OF INVENTION

Technical Problem

Since the conventional hydraulic cylinders rely on pressures and flows provided by hydraulic pumps and valves, its maneuverability is quite limited. A normal cylinder is limited by way of limited pressure and flow input and therefore may not work where greater force is required. For applications, where greater force is required, it is required to replace the smaller cylinder by a relatively larger cylinder. A consequence of this is that the larger cylinder will be slower to extend and retract. Therefore, there is a felt need for an efficient and compact hydraulic cylinder that can work over a broad range of required force.

Solution to Problem

The intrascopic arrangement of multiple cylinders within each other as disclosed in this invention creates its own pressure higher than what is supplied by conventional hydraulic circuits. This transforms a cylinder into a cylinder-pump.

The intrascopic cylinder of this invention can work quickly as a small cylinder does but has the added ability to produce enormous force when needed. In most applications a hydraulic cylinder will only use a small amount of its potential strength but it needs to be large enough to produce occasional peak loads. This invention allows for a cylinder to be smaller, lighter, and faster but still have the ability to produce great force when needed.

Advantageous Effects of Invention

The intrascopic hydraulic cylinder of this invention can be used for variety of applications where conventional hydraulic cylinders are used and beyond where standard hydraulic cylinders are found inadequate. The major uses of the invention are intensification, variable speed, variable loads, variable forces and greater forces than are possible with the same size conventional hydraulic cylinder.

BRIEF DESCRIPTION OF DRAWINGS

FIG. 1 shows a cross-sectional view of the intrascopic hydraulic cylinder of this invention in one embodiment.

FIG. 2 shows a cross-sectional view of the intrascopic hydraulic cylinder of this invention in second embodiment.

FIG. 3 shows the test results of a hydraulic cylinder prototype of this invention.

REFERENCE NUMERALS IN THE DRAWINGS

Figure 4:
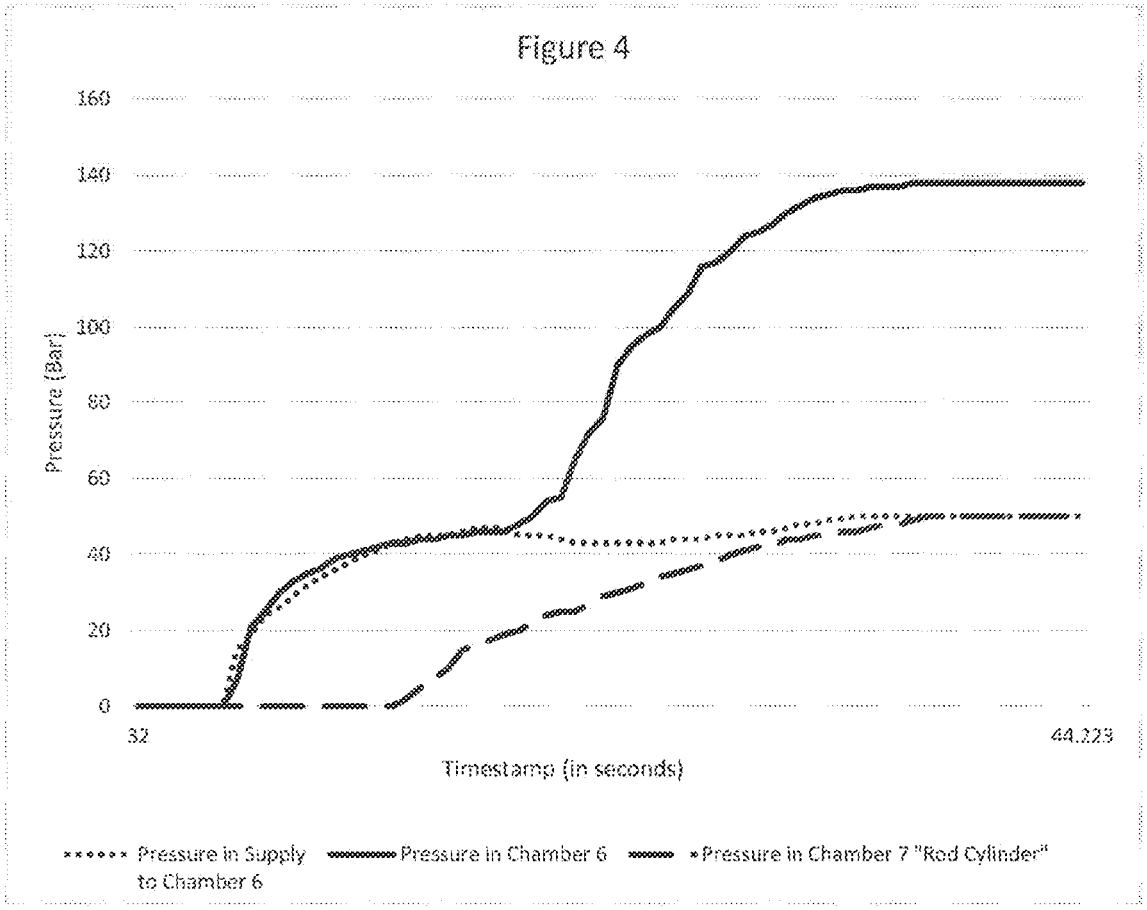
FIG. 4 shows the graphical representation of the test results shown in FIG. 3.

1 Cylinder Hollow Rod
2 Piston
3 Piston—Gland
4 Inner Rod
5 Cylinder Base
6 Chamber
7 Chamber
8 Chamber
9 Chamber
10 Cylinder
11 Hydraulic port
12 Hydraulic port
13 Hydraulic port
14 Fibre
15 Hollow Rod

DESCRIPTION OF EMBODIMENTS

The details of preferred embodiment of this invention along with inventive steps will now be specifically described that address the issues raised in the background and prior art above. There could be several other possible embodiments of this invention deploying the key inventive steps described here and, therefore, the scope and objective of the patent are not limited.

The intrascopic cylinder of this invention has been conceived as a combination of two hydraulic cylinders integrated into one whose outer casing or envelope is virtually similar to a standard cylinder. Thus, in this conception an inverted smaller hydraulic cylinder inside the outer cylinder acts like a piston-rod assembly of a conventional hydraulic cylinder. This contraption allows one to have more than two chambers (front and rear chambers) as in conventional hydraulic cylinder with attendant more number of hydraulic ports. In this contraption, when pressure is applied to one of the chambers, its internal rod would extend into the opposite chamber displacing its mass and dramatically increasing the pressure inside it. This displacement is effectively an internal pump which can be activated multiple times within a given stroke of the modified rod (i.e. inverted smaller cylinder inside the outer cylinder).

The above conception is completely 'novel' and has not been reported, to our knowledge, anywhere before. Further, inventive features of this invention are described below by way of possible embodiments in the following examples:

EXAMPLE

FIG. 1 shows one possible embodiment of this invention where smaller cylinder termed as 'Cylinder Hollow Rod', 1 acts like a rod of conventional hydraulic cylinder inside the outer cylinder 10 and base 5 which is more or less like an outer casing of a conventional hydraulic cylinder. The difference between this contraption and the conventional hydraulic cylinder being that the embodiment of FIG. 1 now has multiple ports for fluid, 11, 12 and 13 corresponding to four chambers, 6 & 7, 8 and 9. The rod end of the smaller inner cylinder, 1 is hollow and contains a piston, 2 a gland 3 and an internal rod 4. The outer cylinder, 10 is similar to conventional double acting cylinder. When pressure is applied to chamber 7, the internal rod 4 extends into the chamber 6, displacing its mass and dramatically increases the pressure in Chamber 6. This displacement is effectively an internal pump which can be activated multiple times within a given stroke of rod 1.

By introducing pressure in to chamber 6 and then upon challenge, subsequently into chamber 7, rod 4 will displace the existing pressurized chamber 6 and increase the pressure in that chamber. The cylinder, 10 will produce more force transmitted through rod 1 than a conventional cylinder of the same bore size.

By introducing pressure to chamber 7 after chamber 6 has reached its maximum force potential at system pressure or pre-determined pressure, rod 4 will displace fluid in chamber 6 increasing the pressure in chamber 6 beyond what was previously introduced by the hydraulic supply or "system pressure". This enables the intrascopic cylinder to create forces previously not achievable within normal size envelopes and in a hydraulic system which cannot offer unlimited pressure.

The concept of integrated hydraulic cylinders within each other can be practiced in many different embodiments. FIG. 2 depicts another embodiment of this invention wherein the internal rod, 4 slides inside a hollow rod, 15.

In this embodiment of FIG. 2, when pressure is applied to chamber 6 and subsequently chamber 7, piston 2 forces rod 4 into chamber 6 and subsequently forces hollow rod, 15 into chamber 6 producing multiple speeds and forces.

Thus, whereas the conventional hydraulic cylinders rely on pressures and flows provided by hydraulic pumps, valves and external intensifiers, the intrascopic cylinder of this invention creates its own pressure higher than what is supplied by conventional hydraulic circuits. This transforms the cylinder into a cylinder/pump.

Buckling and band strength are two significant challenges in the manufacturing of hydraulic cylinders, which is overcome here in this invention by having the inner rod 1 being wide and hollow. Care is taken to see that the rod, 4 and the rear block, 5 as in FIG. 1 are such that they would not collide.

Bowing, i.e. the expansion of the outer cylinder, 10 (FIG. 1) is another problem area in hydraulic cylinders, which is avoided here by an extra cover of fibrous material, i.e., carbon fibre or nanotube fibre, 14 on the outer cylinder, 10 of the intrascopic hydraulic cylinder of this invention.

BEST MODE OF PERFORMING THIS INVENTION & INDUSTRIAL APPLICABILITY

In order to demonstrate the industrial applicability of this invention, a laboratory scale prototype cylinder was fabricated as per the design shown in FIG. 1. The chambers 6 and 7 of the cylinder were equipped with appropriate pressure gauges to monitor the pressure inside these chambers when fluid was allowed to go inside through the port at chamber 6 at a given outside pressure. The pressures in chambers 6 and 7 were observed with respect to the supply pressure to chamber 6 as shown in FIG. 3. FIG. 4 shows a graphical representation of the observed pressure in chamber 6 due to intrascopic augmentation of pressure in this cylinder. It can be seen that with a relatively lower pressure of about 50 bar, it is possible to achieve a pressure as large as 135 bar.

What is claimed is:

1. A hydraulic cylinder assembly comprising:

an outer cylindrical housing; and an inverted hydraulic cylinder inside the outer cylindrical housing, wherein the inverted hydraulic cylinder is smaller than the outer cylindrical housing and functions as a piston-rod assembly held longitudinally displaceably within the outer cylindrical housing, and wherein the inverted hydraulic cylinder comprises a cylindrical hollow rod containing a piston, a piston-gland and an inner rod,

*wherein the cylindrical hollow rod has a further hollow rod affixed in the piston-gland, wherein the inner rod of the cylindrical hollow rod extends and retracts by sliding within the further hollow rod.*

2. The hydraulic cylinder assembly according to claim 1, wherein the cylindrical hollow rod has a hydraulic port for the flow of fluid in its body at a top end, wherein the hydraulic port is external to the hydraulic cylinder assembly and wherein the outer cylindrical housing has an additional hydraulic port for flow of fluid near a base of the outer cylindrical housing, wherein the additional hydraulic port is internal to the hydraulic cylinder assembly.

3. The hydraulic cylinder assembly according to claim 1, [wherein the cylindrical hollow rod has a further hollow rod affixed in the piston-gland, wherein the inner rod of the cylindrical hollow rod extends and retracts by sliding within the further hollow rod, and]

wherein, when pressure is applied to a cap end chamber of the cylindrical hollow rod, the piston of the cylindrical hollow rod forces the inner rod into a cap end chamber of the outer cylindrical housing and subsequently forces the further hollow rod into the cap end chamber of the outer cylindrical housing.

4. The hydraulic cylinder assembly according to claim 1, wherein the outer cylindrical housing has a cylinder base and a hydraulic port for the flow of fluid near the cylinder base and also has an additional hydraulic port for flow of fluid in its body, wherein both the hydraulic port and the additional hydraulic port are external to the body of the outer cylindrical housing.

5. The hydraulic cylinder assembly according to claim 1, wherein the outer cylindrical housing has a cover of fibrous material on a body of the outer cylindrical housing.

6. The hydraulic cylinder assembly according to claim 5, wherein the cover of fibrous material comprises carbon fibre or nanotube fibre.

7. The hydraulic cylinder assembly according to claim 2, [wherein the cylindrical hollow rod has a further hollow rod affixed in the piston-gland, wherein the inner rod of the cylindrical hollow rod extends and retracts by sliding within the further hollow rod, and]

wherein, when pressure is applied to a cap end chamber of the cylindrical hollow rod, the piston of the cylindrical hollow rod forces the inner rod into a cap end chamber of the outer cylindrical housing and subsequently forces the further hollow rod into the cap end chamber of the outer cylindrical housing.

8. The hydraulic cylinder assembly according to claim 7, wherein the outer cylindrical housing has a cylinder base and a hydraulic port for the flow of fluid near the cylinder base and also has an additional hydraulic port for flow of fluid in its body, wherein both the hydraulic port and the additional hydraulic port are external to the body of the outer cylindrical housing.

9. The hydraulic cylinder assembly according to claim 8, wherein the outer cylindrical housing has a cover of fibrous material on its body.

[10. The hydraulic cylinder assembly according to claim 9, wherein the cover of fibrous material comprises carbon fibre or nanotube fibre.]

11. The hydraulic cylinder assembly according to claim 7, wherein the outer cylindrical housing has a cover of fibrous material on its body.

[12. The hydraulic cylinder assembly according to claim 11, wherein the cover of fibrous material comprises carbon fibre or nanotube fibre.]

13. The hydraulic cylinder assembly according to claim 2, wherein the outer cylindrical housing has a cylinder base and a hydraulic port for the flow of fluid near the cylinder base and also has an additional hydraulic port for flow of fluid in its body, wherein the both the hydraulic port and the additional hydraulic port are external to the body of the outer cylindrical housing.

14. The hydraulic cylinder assembly according to claim 13, wherein the outer cylindrical housing has a cover of fibrous material on its body.

15. The hydraulic cylinder assembly according to claim 2, wherein the outer cylindrical housing has a cover of fibrous material on its body.

[16. The hydraulic cylinder assembly according to claim 15, wherein the cover of fibrous material comprises carbon fibre or nanotube fibre.]

17. The hydraulic cylinder assembly according to claim 3, wherein the outer cylindrical housing has a cover of fibrous material on its body.

[18. The hydraulic cylinder assembly according to claim 17, wherein the cover of fibrous material comprises carbon fibre or nanotube fibre.]

19. The hydraulic cylinder assembly according to claim 4, wherein the outer cylindrical housing has a cover of fibrous material on its body.

[20. The hydraulic cylinder assembly according to claim 19, wherein the cover of fibrous material comprises carbon fibre or nanotube fibre.]

*21. The hydraulic cylinder assembly of claim 1, wherein the piston within the cylindrical hollow rod has a piston surface that faces a cap end chamber of the cylindrical hollow rod and that is greater in area than an end surface of the inner rod that faces a cap end chamber of the outer cylindrical housing.*

*22. The hydraulic cylinder assembly of claim 21, wherein the cylindrical hollow rod has a first hydraulic port for flow of fluid in its body at a top end to control pressure in the cap end chamber of the cylindrical hollow rod, and*

*wherein the outer cylindrical housing has a cylinder base and a second hydraulic port for flow of fluid near the cylinder base to control pressure in the cap end chamber of the outer cylindrical housing, and also has a third hydraulic port for flow of fluid in its body to control pressure in another chamber of the outer cylindrical housing.*

*23. A hydraulic cylinder assembly comprising:*

*an outer cylindrical housing; and*

*an inverted smaller hydraulic cylinder inside the outer cylindrical housing which acts like a piston-rod assembly held longitudinally displaceably within the outer cylindrical housing, wherein the inverted smaller hydraulic cylinder comprises a cylindrical hollow rod containing a piston, a piston-gland and an inner rod, and*

*wherein the cylindrical hollow rod has a further hollow rod affixed in the piston-gland, wherein the inner rod of the cylindrical hollow rod extends and retracts by sliding within the further hollow rod.*

*24. The hydraulic cylinder assembly of claim 23, wherein, when pressure is applied to a cap end chamber of the cylindrical hollow rod, the piston of the cylindrical hollow rod forces the inner rod into a cap end chamber of the outer cylindrical housing and subsequently forces the further hollow rod into the cap end chamber of the outer cylindrical housing.*

*25. The hydraulic cylinder assembly according to claim 23, wherein the cylindrical hollow rod has a first hydraulic port for flow of fluid in its body at a top end to control pressure in a cap end chamber of the cylindrical hollow rod, and*

*wherein the outer cylindrical housing has a cylinder base and a second hydraulic port for flow of fluid near the cylinder base to control pressure in a cap end chamber of the outer cylindrical housing, and also has a third hydraulic port for flow of fluid in its body to control pressure in another chamber of the outer cylindrical housing.*

* * * * *